United States Patent
Kelly et al.

(10) Patent No.: US 9,097,536 B2
(45) Date of Patent: Aug. 4, 2015

(54) INDOOR NAVIGATION TECHNIQUES TO CALIBRATE/RECALIBRATE INERTIAL SENSORS AND NAVIGATION PROCESSING

(71) Applicant: mCube, Incorporated, San Jose, CA (US)

(72) Inventors: Joe Kelly, Center Point, IA (US); Jobe Price, North Liberty, IA (US); Rahul Bakshi, San Jose, CA (US)

(73) Assignee: mCube, Inc., San Jose, CA (US)

( * ) Notice: Subject to any disclaimer, the term of this patent is extended or adjusted under 35 U.S.C. 154(b) by 237 days.

(21) Appl. No.: 13/758,486

(22) Filed: Feb. 4, 2013

(65) Prior Publication Data

US 2013/0211711 A1    Aug. 15, 2013

Related U.S. Application Data

(60) Provisional application No. 61/594,342, filed on Feb. 2, 2012.

(51) Int. Cl.
| | |
|---|---|
| *G01C 21/00* | (2006.01) |
| *G08G 1/123* | (2006.01) |
| *G01C 21/20* | (2006.01) |
| *G01C 21/16* | (2006.01) |
| *G01S 19/49* | (2010.01) |

(52) U.S. Cl.
CPC ............ *G01C 21/206* (2013.01); *G01C 21/165* (2013.01); *G01S 19/49* (2013.01)

(58) Field of Classification Search
USPC ............ 701/1, 408, 409, 445, 448, 454, 461, 701/468, 471, 472
See application file for complete search history.

(56) References Cited

U.S. PATENT DOCUMENTS

| | | | |
|---|---|---|---|
| 8,502,659 B2 * | 8/2013 | Richey et al. ............ 340/539.13 |
| 8,510,077 B1 * | 8/2013 | Zhang et al. ................ 702/150 |
| 8,527,308 B2 * | 9/2013 | Nielsen et al. ............... 705/7.11 |
| 8,589,066 B2 * | 11/2013 | Haleem ........................ 701/408 |
| 8,643,544 B2 * | 2/2014 | Taylor et al. ................. 342/451 |
| 8,712,686 B2 * | 4/2014 | Bandyopadhyay et al. .. 701/446 |
| 2012/0116677 A1 * | 5/2012 | Higgison et al. ............. 701/518 |
| 2013/0157682 A1 * | 6/2013 | Ling ......................... 455/456.1 |

* cited by examiner

*Primary Examiner* — Rami Khatib
(74) *Attorney, Agent, or Firm* — Kilpatrick Townsend and Stockton LLP

(57) ABSTRACT

A computer-implemented method for determining geographic locations of a device includes receiving with a GPS receiver within the device, satellite signals from a plurality of GPS satellites, determining with the device, an approximate geographic location in response to the satellite signals, determining in the device, a potential GPS signal reduction condition in response to the satellite signals and to a GPS signal threshold, determining with physical perturbation sensors in the device, physical perturbations, determining with the device, an augmented geographic location in response to the approximate geographic location, the physical perturbations, and a weighting factor, determining with the device, a user display in response to the augmented geographic location, and outputting on a display of the device, the user display.

20 Claims, 4 Drawing Sheets

INDOOR NAVIGATION TECHNIQUES TO CALIBRATE/RECALIBRATE INERTIAL SENSORS AND NAVIGATION PROCESSING

CROSS-REFERENCE TO RELATED APPLICATIONS

The present invention claims priority to and is a non-provisional of U.S. Ser. No. 61/594,342 filed Feb. 2, 2012 that is incorporated by reference herein, for all purposes.

BACKGROUND

The present invention relates to portable device navigation/positioning methods and apparatus. More specifically, embodiments of the present invention relate to methods for using global positioning system data, physical-based inertial data, and or wireless signals for navigation/positioning purposes.

One source of outdoor location geographically referenced positioning data includes Global Navigation Satellite System (GNSS). In the US, the Global Positioning System (GPS) is the most widely used standard for GNSS performance. In the present disclosure, reference to a "GPS" refers more generally to any GNSS positioning source.

The inventors recognize that conventional hand held devices rely only upon GPS signals to determine the user position, however such data is typically only available if the user has an unobstructed view of the sky. The GPS user positioning data will become significantly degraded in performance or absent altogether when the user is in the shadow of a building, inside a car park, in a subway or tunnel, transmission tower, or other types of structures or GPS interference.

Upon entry to a building, the inventors expect GPS signals to be generally unusable, and even hand-held devices including modern high-sensitivity receivers will experience spotty coverage and large uncertainty in positioning. For navigation purposes, the inventors believe that once a GPS signal is lost, it is not practical or possible to "go back" or revert to the most recent navigation solution and coast forward in time. Instead, when GPS signals are subsequently received, new navigation solutions to a destination need to be determined.

Accordingly, in various embodiments, the inventors believe that for navigation purposes, it is useful to know in advance whether GPS is about to be lost so that other navigation methods (e.g. dead reckoning) may be initiated.

BRIEF SUMMARY OF THE INVENTION

In various embodiments, the inventors of the present invention believe that users of hand-held devices will want to know their present location whether they are inside or outside. Further, the inventors believe that users will want to and have navigation solutions that are seamless as they travel between indoor locations to and from outdoor locations.

In various embodiments, when it is determined that GPS signals are likely to be lost or degraded, other sensors and processes can be powered-up or initiated to maintain navigation accuracy. For example, when a tall building location (possibly having a GPS shadow) is known from map data, embodiments use the GPS data along with a velocity estimate to determine if a user is likely to enter the GPS shadow or ambiguous area. In other embodiments, a potential loss of GPS signal condition may be determined by monitoring strength of GPS signals compared to one or more thresholds. In various embodiments, if such potential loss of signal conditions are determined, physical sensors such as accelerometers, gyroscopes, magnetometers, and the like can be powered-up, the sampling rate be increased, or the like. Physical data from such sensors can then be used to estimate the location of the portable device, by using dead reckoning, or the like.

Embodiments may be used within outdoors navigation where there are GPS shadows between tall buildings, within tunnels, or the like. Other embodiments may also be used for outdoors and indoors navigation. For example, embodiments may also estimate positions of the portable device within a building or structure.

In some embodiments, if an exact location of a building is not known in terms of GPS coordinates from map data, auxiliary data from GPS receivers, such as signal strength ($C/N_o$) measurements or the locations of satellites in the sky that are (or are not) tracked, can be used to indicate the presence of a large structure in close proximity to the user. Again, based upon the identification of a position within possible GPS loss, e.g. signal strength below a threshold, embodiments of a navigation application begin preparing for possible denial of full GPS service. In some embodiments, these actions may include retuning filters, initiating new processes (e.g. running applications), enabling or increasing the sampling rates of various sensors, powering-up of sensors, indicating to a user that degradation of navigation accuracy is imminent, or the like.

According to one aspect of the invention, a computer-implemented method for determining geographic locations of a device implemented on a device programmed to perform the method is described. One technique includes receiving with a GPS receiver within the device, satellite signals from a plurality of GPS satellites, and determining with the device, an approximate geographic location in response to the satellite signals. A process includes determining in the device, a potential GPS signal reduction condition in response to the satellite signals and to a GPS signal threshold, and determining with physical perturbation sensors in the device, physical perturbations. A method includes determining with the device, an augmented geographic location in response to the approximate geographic location, the physical perturbations, and a weighting factor, determining with the device, a user display in response to the augmented geographic location, and outputting on a display of the device, the user display.

According to another aspect of the invention, a device programmed to determine geographic locations of a user is disclosed. One device includes a GPS receiver configured to receive satellite signals from a plurality of GPS satellites, and a plurality of physical perturbation sensors configured to determine physical perturbations. An apparatus includes a processing unit coupled to the GPS receiver and to the plurality of physical perturbation sensor, wherein the processing unit is programmed to determine an approximate geographic location in response to the satellite signals, wherein the processing unit is programmed to determine a potential GPS signal reduction condition in response to the satellite signals and to a GPS signal threshold, wherein the processing unit is programmed to determine an augmented geographic location in response to the approximate geographic location, the physical perturbations, and a weighting factor, and wherein the processing unit is programmed to determine a user display in response to the augmented geographic location, and a display coupled to the processing unit, wherein the display is configured to display the user display to the user.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF THE INVENTION

Figure 1:
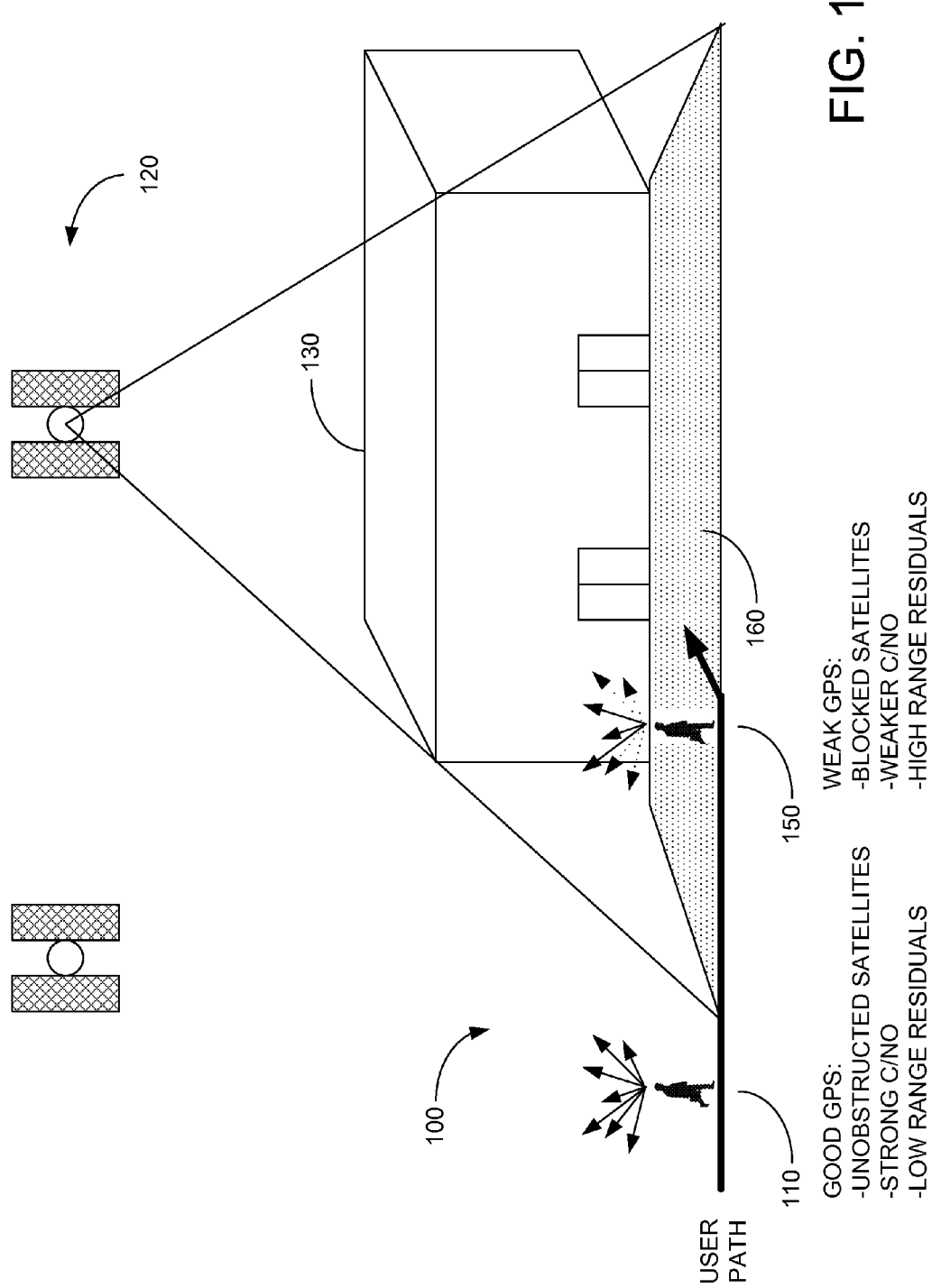
FIG. 1 illustrates an embodiment of the present invention.

FIG. 1 illustrates an example according to various embodiments of the present invention. More specifically, FIG. 1 illustrates a situation where a user 100 with a hand held navigation device is entering a GPS shadow or GPS ambiguity area 160.

As illustrated in FIG. 1, at position 110, user 100 receives relatively stable GPS signals from a number of GPS satellites, 120. Position 110 is illustrated away from building or location 130. In position 110, in various embodiments, a navigation process running upon position 110 relies upon GPS signals primarily to determine the position of user 100.

As shown in FIG. 1, at position 150, user 100 enters a region 160 near building 130. Within this region 160, it is expected that GPS signals from one or more GPS satellites 120 are reduced or degraded because of building 130. In various embodiments, the degradation may be from building 130 physically blocking GPS signals from GPS satellites, emissions from building 130 interfering with GPS signals, or the like.

In some embodiments, the reduced or degraded GPS signals may be compared to one or more GPS signal thresholds to determine a GPS exception condition. In some embodiments, the degradation is not binary, but gradual. Accordingly, counter measures detailed below may be initiated before total loss of GPS signals is determined.

In some embodiments, GPS signals may or may not actually be degraded or be less than the GPS thresholds for an exception condition to occur. In some embodiments, locations within region 160 may be pre-associated with an exception condition within a mapping type program. Within such regions, GPS signals may be expected to be degraded, but may not actually be degraded. Some examples of regions may include locations around a tall building, within a tunnel, indoors, or the like. In various embodiments, the hand-held device may have one or more maps stored therein that identify locations of expected exception conditions, and in other embodiments, the hand-held device may receive an exception condition from a remote mapping server. As an example of this, using Google Maps, or the like, the GPS location of the user is sent to the Google mapping server. Next, the Google mapping server receives the GPS location and determines whether that location is within an expected GPS degradation location, e.g. region 160. If so, the Google mapping server may return an exception condition to the hand held device.

In various embodiments, when the exception condition is determined, the hand-held device may initiate one or more processes that help mitigate the degradation or loss of GPS signals, as detailed below.

Figure 2:
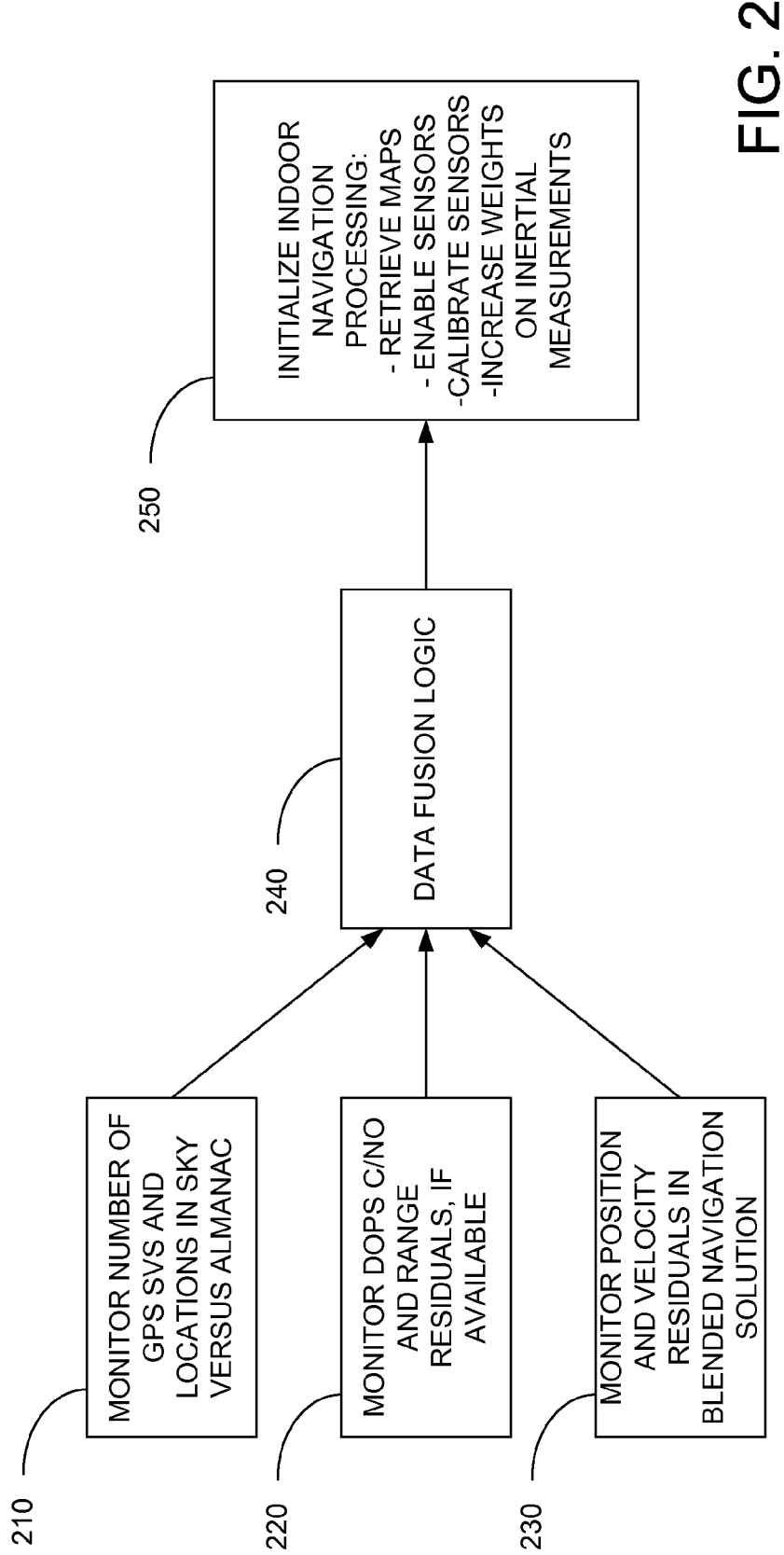
FIG. 2 illustrates a block diagram of various embodiments of the present invention.

FIG. 2 illustrates a block diagram of various embodiments of the present invention. More specifically, FIG. 2 illustrates various functional blocks for determining an exception condition, and functional blocks for handling the exception condition in context of position determination and/or navigation solution. In various embodiments, the functional blocks are implemented by a processor of a smart phone, or other computing device, executing executable software.

In various embodiments, a processing block 210 is provided that receives and monitors GPS signals from one or more GPS satellites. FIG. 2 also illustrates a processing block 220 that monitors one or more qualities of the GPS signals. In some examples, one or more characteristics of the GPS signals may be determined, such as dilution of precision of the GPS signals, carrier-to-noise ratio, range residual, or the like. Additionally, in various embodiments, processing block 230 includes a navigation application, or the like that monitors position and velocity residuals with regards to a previously computed navigation solution (e.g. routing from point A to B.)

In various embodiments, a processing block 240 is illustrated that monitors the data from processing blocks 210-230, and determines if the user moving to a region of GPS degradation (e.g. indoors). In various embodiments, if such an expected exception condition is determined, a number of functions may be performed in processing block 250.

In some specific embodiments, based upon the early indication that the user is nearing a building, indoor navigation sensors/processes warm up or spool up so that there is no gap in capability upon entering indoor environment. In various embodiments, some examples of specific processing that can be performed are include initiating or powering-up of inertial-based measurement devices, increasing a sampling frequency of such devices (e.g. accelerometer, gyroscope, magnetometer), or the like.

In various embodiments, a transition from GPS/outdoor navigation capability to inertial (also gyro, magneto, and/or pressure) navigation capability may be performed smoothly, as GPS signals degrade further. In some examples, this smooth transition may include:

Rely more on inertial measurements knowing that GPS is degraded;

Let blending filters converge from a start-up condition;

Let blending filters converge using GPS data to accurately estimate biases prior to going indoors;

Loading maps for buildings likely to be entered; especially useful if they must be downloaded to device from external database or service; or the like.

In various embodiments, an assumption may be made that the user is entering through one of the doors of the building, as a starting position for indoor navigation; an alternative assumption may be made that the user is entering through a door of the building closest to the GPS determined location. Such assumptions help seed an indoor navigation program with more likely starting points, and help reduce interior map search size.

Figure 3:
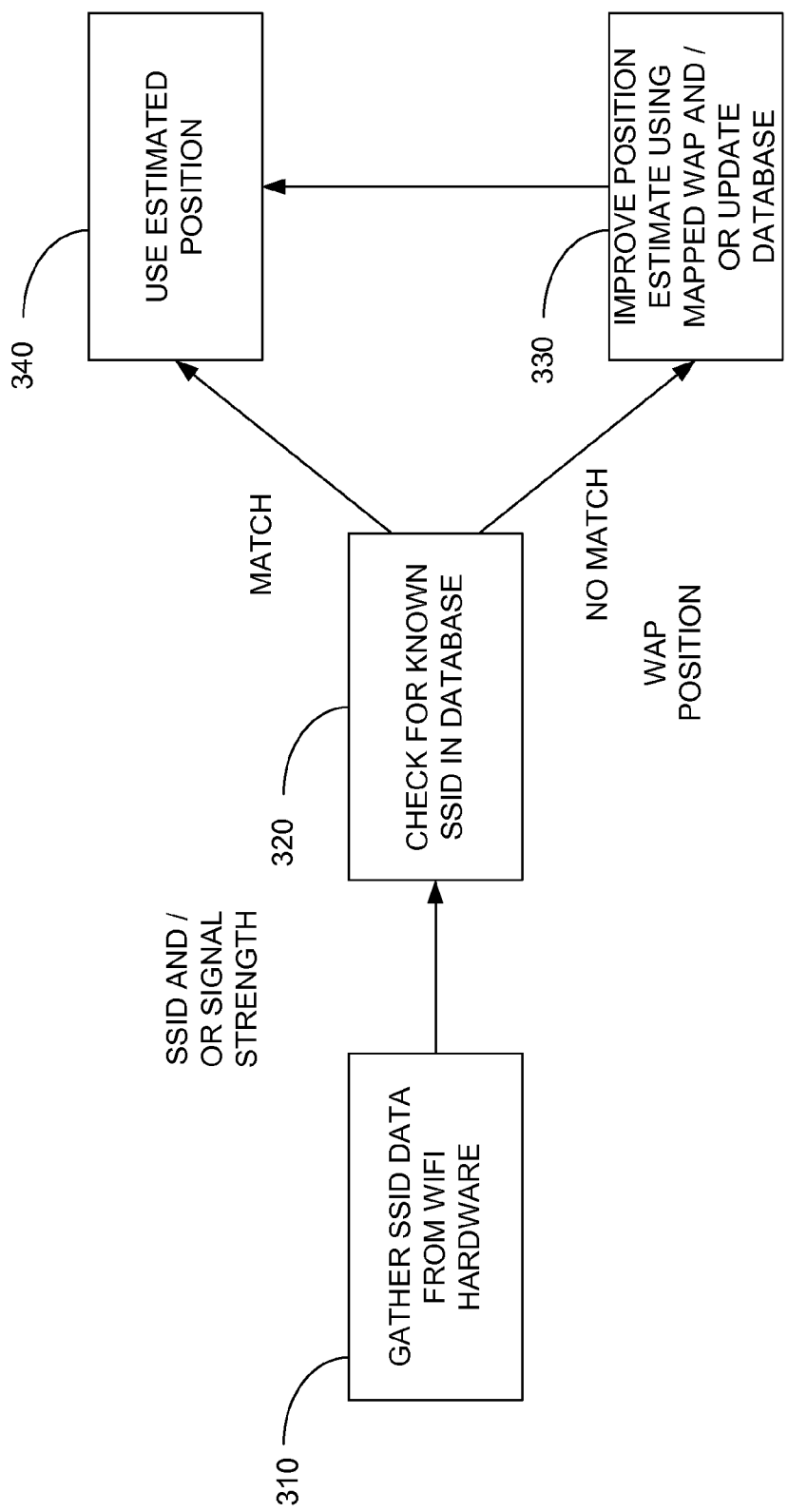
FIG. 3 illustrates a block diagram of various embodiments of the present invention.

FIG. 3 illustrates a block diagram of various embodiments of the present invention. More specifically, FIG. 3 illustrates using Wi-Fi-derived data for navigation. Some embodiments may be implemented for outdoors, or indoors navigation. Other embodiments may be implemented for outdoors or indoors navigation within regions of degraded GPS signals.

In various embodiments, functional blocks 310-340 are illustrated. Functional blocks are typically implemented by a processor of a smart phone, or other computing device, executing executable software.

In some embodiments, Wi-Fi-based positioning may also be used to augment GPS positioning data, as GPS data is reduced. Such embodiments however are expected to require a substantial database of physical hardware identifiers (MAC addresses) for Wi-Fi Access Points (WAPs). Accordingly, in some embodiments, another approach is to use Wi-Fi signals to augment GPS positing data is to rely upon common (Service Set Identifiers) SSIDs of Wi-Fi signals to help identify a position of the user (without GPS signals).

In various embodiments, using a known or standardized SSID, along with a database that ties SSID to user location, are expected to provide the following benefits:

Does not require a full database of individual wireless hardware (MAC addresses), but rather can be used with a map of vendors and a smaller database of their standard SSIDs;

Enables a type of Simultaneous Location and Mapping (SLAM) so that new or unrecognized SSIDs can be added to the database and tagged. In some embodiments:

Databases could be built up in locations that are frequently visited

Databases could be populated at a network level for multiple (or new) users.

In various embodiments, a processing block 310 receives and identifies one or more SSID data from one or more Wi-Fi signals received in a user's smart phone, or the like. Subsequently, the one or more SSID data is compared in block 320, to one or more SSID databases (on the smart phone, or on a remote server), to determine whether the SSID/geographic locations association have previously been made.

In cases where no match is found, the new SSIDs and the geographic locations of the user (via partial or complete GPS data, via map-based data, or the like), are associated in the SSID database, block 330. When a match is found, the current position of the user, with a navigation application (e.g. map), is updated based upon the match, block 340. For example based upon triangulation of more than one SSID/geographic positions, a position of a user within an interior navigation solution may be set, modified, or reset. For instance, based upon the determination of SSID signals and geographical locations from Wi-Fi signals from Hot Dog on A Stick, McDonalds, Subway, or the like, the initial user location may be set to a middle of a food court of a shopping mall.

In still other embodiments, other techniques base upon Wi-Fi may be used to augment navigation solutions described herein. Examples of other supporting processing methods that are compatible with SSID-based initialization of the navigation solution are triangulation/trilateration, power reception modeling, map matching, and the like.

Figure 4:
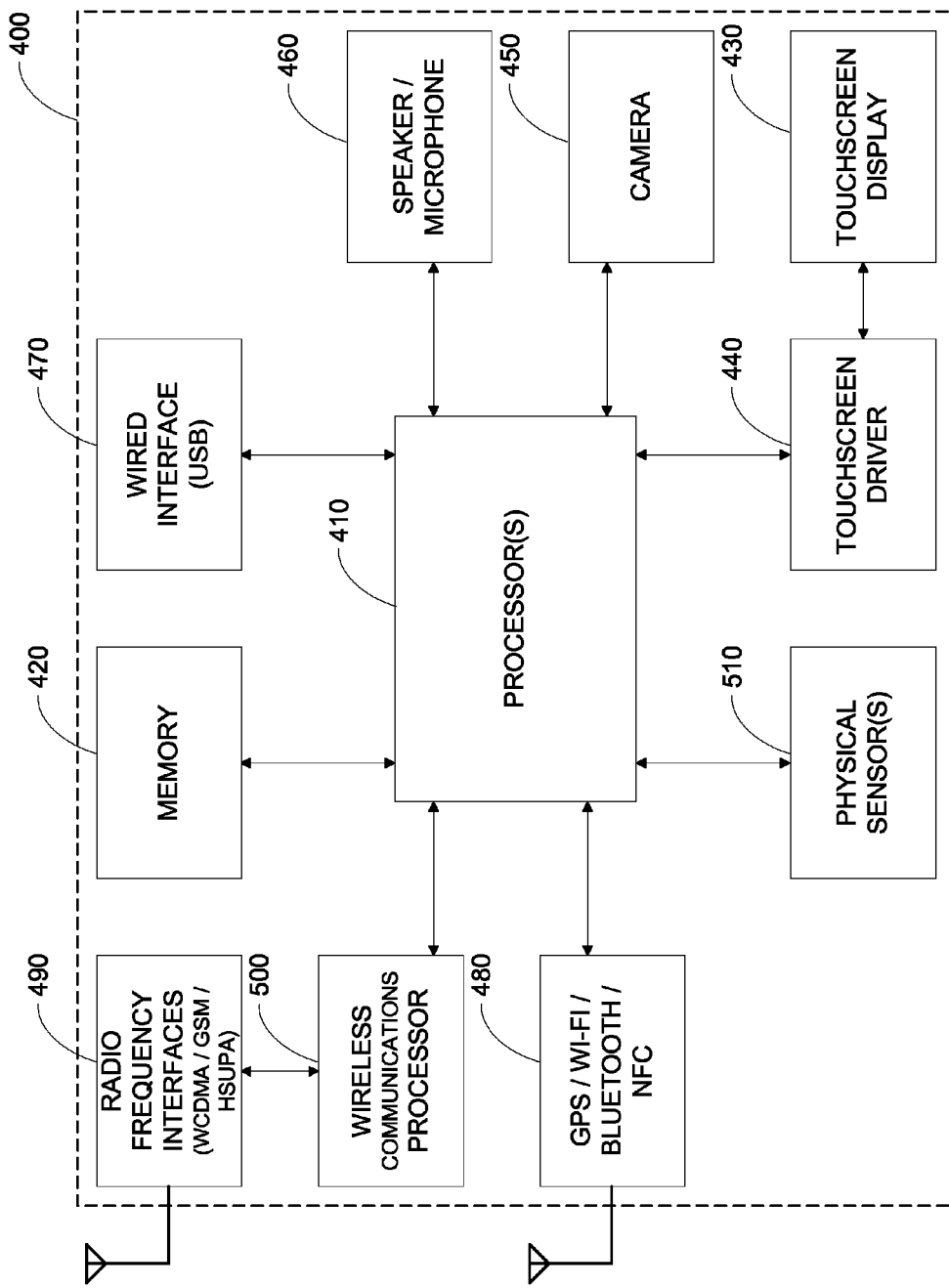
FIG. 4 illustrates a block diagram of a system according to some embodiments of the present invention.

FIG. 4 illustrates a functional block diagram of various embodiments of the present invention. In FIG. 4, a computing device 400 typically includes an applications processor 410, memory 420, a touch screen display 430 and driver 440, an image acquisition device 450, audio input/output devices 460, and the like. Additional communications from and to computing device are typically provided by via a wired interface 470, a GPS/Wi-Fi/Bluetooth interface 480, RF interfaces 490 and driver 500, and the like. Also included in various embodiments are physical sensors 510.

In various embodiments, computing device 400 may be a hand-held computing device (e.g. Apple iPad, Apple iTouch, Lenovo Skylight/IdeaPad, Asus EEE series, Microsoft 8 tablet, Samsung Galaxy Tab, Android Tablet), a portable telephone (e.g. Apple iPhone, Motorola Droid series, Google Nexus series, HTC Sensation, Samsung Galaxy S series, Nokia Lumina series), a portable computer (e.g. netbook, laptop, ultrabook), a media player (e.g. Microsoft Zune, Apple iPod), a reading device (e.g. Amazon Kindle Fire, Barnes and Noble Nook), or the like.

Typically, computing device 400 may include one or more processors 410. Such processors 410 may also be termed application processors, and may include a processor core, a video/graphics core, and other cores. Processors 410 may be a processor from Apple (A4/A5), Intel (Atom), NVidia (Tegra 3, 4, 5), Marvell (Armada), Qualcomm (Snapdragon), Samsung, TI (OMAP), or the like. In various embodiments, the processor core may be an Intel processor, an ARM Holdings processor such as the Cortex-A, -M, -R or ARM series processors, or the like. Further, in various embodiments, the video/graphics core may be an Imagination Technologies processor PowerVR-SGX, -MBX, -VGX graphics, an Nvidia graphics processor (e.g. GeForce), or the like. Other processing capability may include audio processors, interface controllers, and the like. It is contemplated that other existing and/or later-developed processors may be used in various embodiments of the present invention.

In various embodiments, memory 420 may include different types of memory (including memory controllers), such as flash memory (e.g. NOR, NAND), pseudo SRAM, DDR SDRAM, or the like. Memory 420 may be fixed within computing device 400 or removable (e.g. SD, SDHC, MMC, MINI SD, MICRO SD, CF, SIM). The above are examples of computer readable tangible media that may be used to store embodiments of the present invention, such as computer-executable software code (e.g. firmware, application programs), application data, operating system data or the like. It is contemplated that other existing and/or later-developed memory and memory technology may be used in various embodiments of the present invention.

In various embodiments, touch screen display 430 and driver 440 may be based upon a variety of later-developed or current touch screen technology including resistive displays, capacitive displays, optical sensor displays, electromagnetic resonance, or the like. Additionally, touch screen display 430 may include single touch or multiple-touch sensing capability. Any later-developed or conventional output display technology may be used for the output display, such as TFT-LCD, OLED, Plasma, trans-reflective (Pixel Qi), electronic ink (e.g. electrophoretic, electrowetting, interferometric modulating). In various embodiments, the resolution of such displays and the resolution of such touch sensors may be set based upon engineering or non-engineering factors (e.g. sales, marketing). In some embodiments of the present invention, a display output port, such as an HDMI-based port or DVI-based port may also be included.

In some embodiments of the present invention, image capture device 450 may include a sensor, driver, lens and the like. The sensor may be based upon any later-developed or convention sensor technology, such as CMOS, CCD, or the like. In various embodiments of the present invention, image recognition software programs are provided to process the image data. For example, such software may provide functionality such as: facial recognition, head tracking, camera parameter control, or the like.

In various embodiments, audio input/output 460 may include conventional microphone(s)/speakers. In some embodiments of the present invention, three-wire or four-wire audio connector ports are included to enable the user to use an external audio device such as external speakers, headphones or combination headphone/microphones. In various embodiments, voice processing and/or recognition software may be provided to applications processor 410 to enable the user to operate computing device 400 by stating voice commands. Additionally, a speech engine may be provided in various embodiments to enable computing device 400 to provide audio status messages, audio response messages, or the like.

In various embodiments, wired interface 470 may be used to provide data transfers between computing device 400 and an external source, such as a computer, a remote server, a storage network, another computing device 400, or the like. Such data may include application data, operating system data, firmware, or the like. Embodiments may include any later-developed or conventional physical interface/protocol, such as: USB 4.0, 5.0, micro USB, mini USB, Firewire, Apple iPod connector, Ethernet, POTS, or the like. Additionally, software that enables communications over such networks is typically provided.

In various embodiments, a wireless interface 480 may also be provided to provide wireless data transfers between computing device 400 and external sources, such as computers, storage networks, headphones, microphones, cameras, or the like. As illustrated in FIG. 4, wireless protocols may include Wi-Fi (e.g. IEEE 802.11a/b/g/n, WiMax), Bluetooth, IR, near field communication (NFC), ZigBee and the like.

GPS receiving capability may also be included in various embodiments of the present invention, however is not required. As illustrated in FIG. 4, GPS functionality is included as part of wireless interface 480 merely for sake of convenience, although in implementation, such functionality is currently performed by circuitry that is distinct from the Wi-Fi circuitry and distinct from the Bluetooth circuitry.

Additional wireless communications may be provided via RF interfaces 490 and drivers 500 in various embodiments. In various embodiments, RF interfaces 490 may support any future-developed or conventional radio frequency communications protocol, such as CDMA-based protocols (e.g. WCDMA), GSM-based protocols, HSUPA-based protocols, or the like. In the embodiments illustrated, driver 500 is illustrated as being distinct from applications processor 410. However, in some embodiments, this functionality is provided upon a single IC package, for example the Marvel PXA330 processor, and the like. It is contemplated that some embodiments of computing device 400 need not include the RF functionality provided by RF interface 490 and driver 500.

FIG. 4 also illustrates computing device 400 to include physical sensors 510. In various embodiments of the present invention, physical sensors 510 are multi-axis Micro-Electro-Mechanical Systems (MEMS) based devices being developed by M-cube, the assignee of the present patent application. Physical sensors 510 developed by M-cube, the assignee of the present patent application, currently include very low power three-axis sensors (linear, gyro or magnetic); ultra-low jitter three-axis sensors (linear, gyro or magnetic); low cost six-axis motion sensor (combination of linear, gyro, and/or magnetic); ten-axis sensors (linear, gyro, magnetic, pressure); and various combinations thereof.

Various embodiments may include an accelerometer with a reduced substrate displacement bias, as described above. Accordingly, using such embodiments, computing device 400 is expected to have a lower sensitivity to temperature variations, lower sensitivity to production/assembly forces imparted upon to an accelerometer, faster calibration times, lower production costs, and the like.

As described in the patent applications referenced above, various embodiments of physical sensors 510 are manufactured using a foundry-compatible process. As explained in such applications, because the process for manufacturing such physical sensors can be performed on a standard CMOS fabrication facility, it is expected that there will be a broader adoption of such components into computing device 400. In other embodiments of the present invention, conventional physical sensors 510 from Bosch, STMicroelectronics, Analog Devices, Kionix or the like may be used.

In various embodiments, any number of future developed or current operating systems may be supported, such as iPhone OS (e.g. iOS), WindowsMobile (e.g. 7, 8), Google Android (e.g. 5.x, 4.x), Symbian, or the like. In various embodiments of the present invention, the operating system may be a multi-threaded multi-tasking operating system. Accordingly, inputs and/or outputs from and to touch screen display 430 and driver 440 and inputs/or outputs to physical sensors 510 may be processed in parallel processing threads. In other embodiments, such events or outputs may be processed serially, or the like. Inputs and outputs from other functional blocks may also be processed in parallel or serially, in other embodiments of the present invention, such as image acquisition device 450 and physical sensors 510.

FIG. 4 is representative of one computing device 400 capable of embodying the present invention. It will be readily apparent to one of ordinary skill in the art that many other hardware and software configurations are suitable for use with the present invention. Embodiments of the present invention may include at least some but need not include all of the functional blocks illustrated in FIG. 4. For example, in various embodiments, computing device 400 may lack image acquisition unit 450, or RF interface 490 and/or driver 500, or GPS capability, or the like. Additional functions may also be added to various embodiments of computing device 400, such as a physical keyboard, an additional image acquisition device, a trackball or trackpad, a joystick, or the like. Further, it should be understood that multiple functional blocks may be embodied into a single physical package or device, and various functional blocks may be divided and be performed among separate physical packages or devices.

Further embodiments can be envisioned to one of ordinary skill in the art after reading this disclosure. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for determining geographic locations of a device implemented on a device programmed to perform the method comprising:
 receiving with a GPS receiver within the device, satellite signals from a plurality of GPS satellites;
 determining with the device, an approximate geographic location in response to the satellite signals;
 determining in the device, a potential GPS signal reduction condition in response to the satellite signals and to a GPS signal threshold;
 determining with physical perturbation sensors in the device, physical perturbations;
 determining in the device, a Wi-Fi-based positioning data in response to a plurality of Wi-Fi Access Points, wherein the Wi-Fi-based positioning data is provided from a database of MAC address data or Service Set Identifier (SSID) data of Wi-Fi signals from the plurality of Wi-Fi Access Points, wherein determining the Wi-Fi based positioning data comprises:
 gathering SSID data through the Wi-Fi signals from the plurality of Wi-Fi Access Points;

comparing the SSID data to an SSID database to determine a known SSID data or an unknown SSID data;
enabling a Simultaneous Location and Mapping (SLAM) process to update the SSID database with the unknown SSID data using the approximate geographic location or the physical perturbations;
gathering MAC address data from the plurality of Wi-Fi Access Points;
determine the Wi-Fi-based positioning data from the known SSID data, the unknown SSID data, or the MAC address data;
determining with the device, an augmented geographic location in response to the approximate geographic location, the physical perturbations, the Wi-Fi-based positioning data, and a weighting factor, wherein determining the augmented geographic location includes applying a blending filter process using the approximate geographic location, the physical perturbations, the Wi-Fi-based positioning data, and the weighting factor to determine the augmented geographic location;
determining with the device, a user display in response to the augmented geographic location; and
outputting on a display of the device, the user display.

2. The method of claim 1 further comprising:
determining a building identifier associated with the approximate geographic location; and
determining an internal layout of at least a portion of a building in response to the building identifier.

3. The method of claim 2 wherein the building identifier is selected from a group consisting of: a street address, a building name.

4. The method of claim 2 wherein determining with the device, the user display is also in response to the internal layout of at least the portion of the building.

5. The method of claim 1 wherein determining with the physical perturbation sensors in the device, physical perturbations is also in response to the potential GPS signal reduction.

6. The method of claim 5 wherein determining with the physical perturbation sensors in the device further comprises: increasing with the device sampling frequency of the physical perturbation sensors.

7. The method of claim 5 wherein determining with the physical perturbation sensors in the device further comprises: applying with the device power to the physical perturbation sensors.

8. The method of claim 1 wherein the weighting factor is determined in response to the potential GPS signal reduction condition.

9. The method of claim 8 wherein the augmented geographic location is more heavily weighted with the physical perturbations when a potential GPS signal reduction condition is determined.

10. The method of claim 8 wherein the augmented geographic location is more heavily weighted to the approximate geographic location when a potential GPS signal reduction condition is not determined.

11. A device programmed to determine geographic locations of a user comprising:
a GPS receiver configured to receive satellite signals from a plurality of GPS satellites;
a plurality of physical perturbation sensors configured to determine physical perturbations;
a processing unit coupled to the GPS receiver and to the plurality of physical perturbation sensors;
wherein the processing unit is programmed to determine an approximate geographic location in response to the satellite signals;
wherein the processing unit is programmed to determine a potential GPS signal reduction condition in response to the satellite signals and to a GPS signal threshold;
wherein the processing unit is programmed to determine a Wi-Fi-based positioning data in response to a plurality of Wi-Fi Access Points, wherein the Wi-Fi-based positioning data is provided from a database of MAC address data or Service Set Identifier (SSID) data of Wi-Fi signals from the plurality of Wi-Fi Access Points;
wherein the processing unit is programmed to:
gather SSID data through the Wi-Fi signals from the plurality of Wi-Fi Access Points;
compare the SSID data to an SSID database to determine a known SSID data or an unknown SSID data;
enable a Simultaneous Location and Mapping (SLAM) process to update the SSID database with the unknown SSID data using the approximate geographic location or the physical perturbations;
gather MAC address data from the plurality of Wi-Fi Access Points; and
determine the Wi-Fi-based positioning data from the known SSID data, the unknown SSID data, or the MAC address data;
wherein the processing unit is programmed to determine an augmented geographic location in response to the approximate geographic location, the physical perturbations, the Wi-Fi-based positioning data, and a weighting factor, wherein the processing unit is programmed to determine the augmented geographic location by applying a blending filter process using the approximate geographic location, the physical perturbations, the Wi-Fi-based positioning data, and the weighting factor to determine the augmented geographic location; and
wherein the processing unit is programmed to determine a user display in response to the augmented geographic locations; and
a display coupled to the processing unit, wherein the display is configured to display the user display to the user.

12. The device of claim 11
wherein the processing unit is programmed to determine a building identifier associated with the approximate geographic location; and
wherein the device includes a memory coupled to the processing unit, wherein the memory is configured to store an internal layout of at least a portion of a building in response to the building identifier.

13. The device of claim 12 wherein the building identifier is selected from a group consisting of: a street address, a building name.

14. The device of claim 12 wherein the user display is also determined in response to the internal layout of at least the portion of the building.

15. The device of claim 11 wherein the processing unit is programmed to determine the augmented geographic also in response to the potential GPS signal reduction condition.

16. The device of claim 11 wherein the processing unit is programmed to increase a sampling frequency of the physical perturbation sensors in response to the potential GPS signal reduction condition.

17. The device of claim 11 wherein the processing unit is programmed to apply device power to the physical perturbation sensors in response to the potential GPS signal reduction condition.

18. The device of claim 11 wherein the processing unit is programmed to apply device power to the physical perturbation sensors in response to the potential GPS signal reduction condition.

19. The device of claim 18 wherein the processing unit is programmed to less heavily weight the approximate geographic location from the augmented geographic location when the potential GPS signal reduction condition is determined.

20. The device of claim 18 wherein the processing unit is programmed to more heavily weight the approximate geographic location from the augmented geographic location when the potential GPS signal reduction condition is not determined.

* * * * *